Patented Nov. 18, 1952

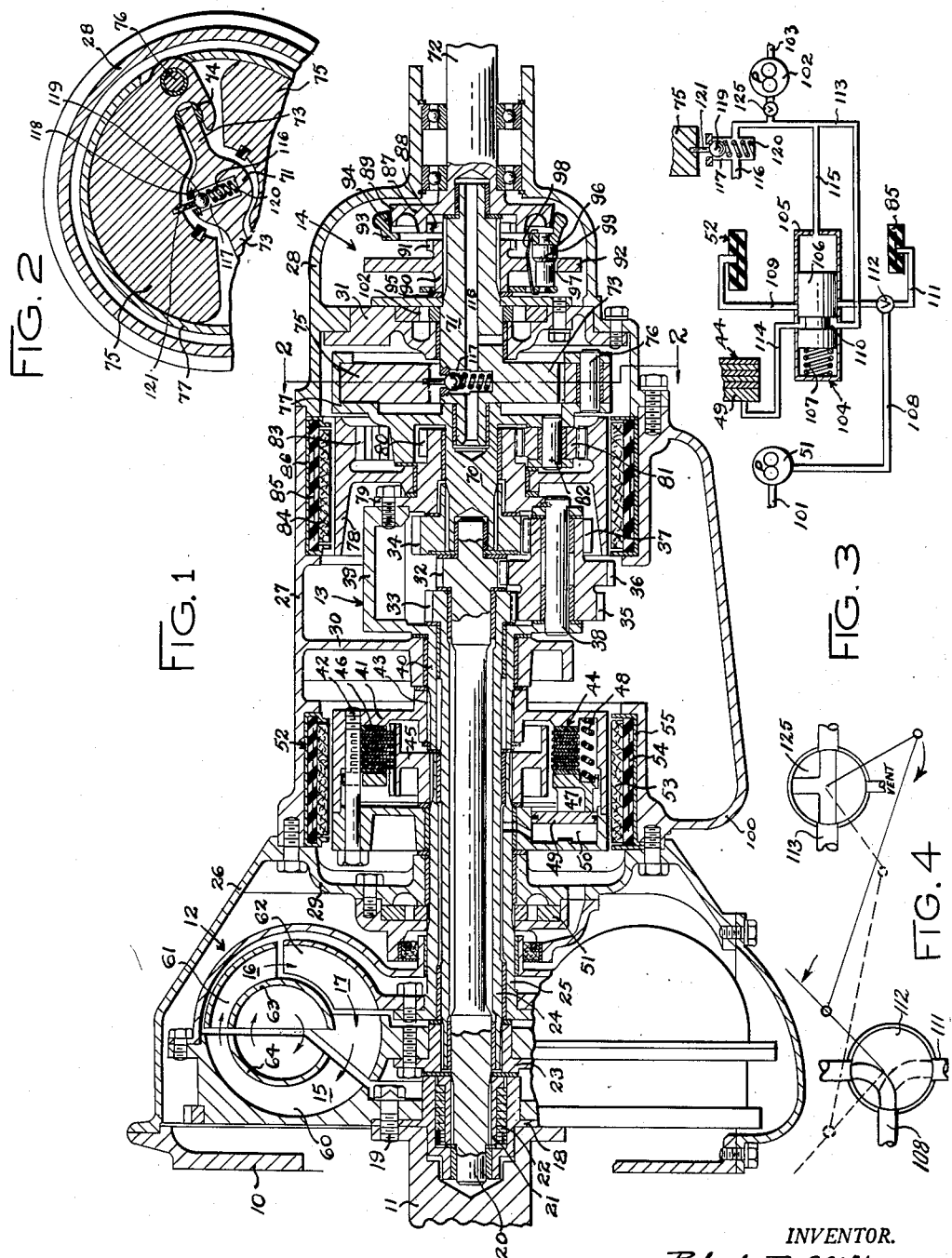

2,618,174

UNITED STATES PATENT OFFICE 2,618,174

TRANSMISSION MECHANISM

Robert P. Clifton, Dearborn, Mich., assignor to Packard Motor Car Company, Detroit, Mich., a corporation of Michigan Application December 1, 1945, Serial No. 632,266

10 Claims. (Cl. 74—732)

This invention relates to transmission mechanism of the type embodying a power driven fluid coupling and multiple ratio planetary gearing.

One of the objects of the invention is to provide a transmission of the type referred to in which the component parts are associated to form a compact structure.

Another object of the invention is to provide a planetary gearing through which three gear ratio drives may be selectively established by a pair of control devices coacting with the planet gear carrier.

Still another object of the invention is to arrange reverse drive mechanism between planetary gearing and a tail shaft so that it will occupy previously unused space and thereby reduce the overall length of the structure.

A further object of the invention is to obtain maximum torque in the low speed drive of a multi-speed transmission, in which a fluid coupling drives planetary gearing, by mechanically connecting the drive shaft with the gearing.

Another object of the invention is to provide a fluid coupling driven planetary gearing in which high speed drive is obtained by a two path power flow between the fluid coupling and the gearing, one path being a mechanical connection in low speed drive and the other path being the mechanical connection and the fluid coupling in high speed drive.

Other objects of the invention will appear from the following description taken in connection with the drawings, which form a part of this specification, and in which:

Fig. 1 is a longitudinal sectional view of a transmission mechanism incorporating the invention;

Fig. 2 is a sectional view of the torque-speed device forming a driving connection and hydraulic control taken on line 2—2 of Fig. 1;

Fig. 3 is a diagrammatic view of control mechanism for the transmission mechanism;

Fig. 4 is a diagrammatic view of a linkage system for manually setting the control valves.

Referring to the drawings by characters of reference, the power transmission mechanism comprises generally a power unit, such as an engine of which the rear wall 10 and crankshaft 11 are illustrated, a fluid coupling 12 of the Fottinger type, planetary gearing 13 and clutch mechanism 14.

The fluid coupling comprises an impeller 15, a primary rotor 16 and a secondary rotor 17. The impeller and a flanged sleeve 18 are fixed to the crankshaft by bolts 19 forming power input means. Shaft 20 projects through the sleeve section and has a sleeve 21 splined thereto, the sleeve and the sleeve section being connectible in drive relation by an overrunning clutch 22 of the coil spring type. The primary rotor 16 has a hub 23 fixed thereto and splined to sleeve shaft 24 telescoping a portion of shaft 20. The secondary rotor 17 is fixed to sleeve shaft 25 telescoping a portion of shaft 24.

The fluid coupling 12, gearing 13 and clutch mechanism 14 are housed in a casing comprised of sections 26, 27 and 28 suitably secured together. Section 26 houses the fluid coupling and has a rear transverse wall 29, section 27 houses the gearing 13 and has a transversely extending wall 30 and section 28 houses the clutch mechanism and has a transversely extending wall 31 fixed therein. The nested shafts 20, 24 and 25 extend through and are supported by wall 29 while shafts 20 and 24 extend through and are supported by wall 30.

The planetary gearing includes drive gear 32 fixed on shaft 20, drive gear 33 fixed on shaft 24, driven gear 34 and stepped planet gears 35, 36 and 37. The planet gears may comprise one or more units each fixed together or formed integrally and they are each rotatably mounted on a pin 38 fixed on carrier 39. The carrier has a forward sleeve portion 40, telescoping shaft 24 and extending through wall 30, and a two part housing 41 secured together by bolts 42 and splined at 43 to sleeve 40. The forward part of housing 41 telescopes shaft 25 and is rotatable relative thereto.

The housing 41 encloses and forms a part of a clutch device 44. In such clutch device, ring 45 is splined to the end of shaft 25 projecting into the housing and this ring and the inner peripheral wall of the housing are slotted to alternately receive clutch plates 46. Pressure ring member 47 is actuated to engage the clutch plates and it is normally positioned by coil springs 48 so that the clutch plates are disengaged. A plurality of pistons 49 are arranged in pockets 50 in the carrier housing and are adapted to actuate the pressure member to engage the clutch device when subjected to controlled fluid pressure in a system connecting star gear pump 51 with the pockets 50. This pump is arranged in wall 29 and is driven by shaft 25.

A brake device 52 is arranged for actuation to prevent rotation of the clutch housing 41. The device consists of a sectional brake band 53 and a rubber actuator tube 54 that can be inflated by the fluid system to contract the brake band against the periphery of the housing 41. The tube and band are housed by and fixed to an annular member 55 fixed to casing section 27.

Gears 33 and 35 are in mesh and have a higher ratio than meshing gears 32 and 36. Low speed drive is obtained through gears 32 and 36 when shaft 20 is driving and intermediate speed drive is obtained through gears 33 and 35 when shaft 24 is the driver. High speed drive is obtained when the clutch device 44 is engaged. It is necessary, in low and intermediate speed drives, for the brake device 52 to be applied to prevent retrograde movement of the planetary gearing carrier 39, but the brake device is disengaged when the clutch device is engaged for high speed drive. Likewise, the clutch device must be disengaged when the brake device is engaged.

The specific form of fluid coupling forms the subject matter of my copending application Serial Number 588,617, filed April 16, 1945, which has issued as Patent No. 2,577,404 granted December 4, 1951. The inner surface of the impeller is dished and carries radial vanes 60 forming curved passages that are open to passages in the primary rotor formed by radial vanes 61. The secondary rotor is dished and has radial vanes 62 forming passages. The primary rotor has a dished shield ring 63 open to a dished shield ring 64 of the impeller. The shield rings serve to divide the passages of the impeller and the primary rotor to form inner and outer circulation circuits for the fluid. The impeller 15 circulates the fluid in the coupling which will flow in one circuit interiorly of the shield rings and in another circuit exteriorly of the shield rings, such circuits being indicated by arrows. In the outer circuit fluid from the impeller discharges into the primary rotor, from the primary rotor it passes to the secondary rotor, then to the second stage of the primary rotor, and then back to the impeller. These circuits have their axes normal to the axes of the impeller and rotors which arrangement is known as the Fottinger type of coupling. The rotors can rotate relative to the impeller and to each other.

Gear 34 of the planetary gearing is splined to driven shaft 70 and a tail shaft 71 is connected in drive relation therewith by a torque-speed device. The tail shaft is connectible with a propeller shaft 72 by the clutch mechanism 14. Shaft 71 has arms 73 extending radially from its forward end and extending through bearing members 74 rotatably mounted on flyweights 75. The flyweights are pivotally mounted on pins 76 fixed to flange 77 on the rear end of shaft 70. The weights are urged inwardly by torque and outwardly by centrifugal force and they are utilized to control clutch device 44 as well as being a part of the drive connection between shafts 70 and 71.

The reverse drive gearing is contained in casing section 27 and encircles the driven shaft 70. Drum 78 is rotatably mounted on an extension 79 of the planetary gearing carrier 39, and the drum has an internal gear 83 arranged to mesh with an idler gear 81 mounted on pin 82 fixed to the shaft flange 77. The idler gear also meshes with gear 80 on the carrier extension 79. A sectional brake band 84 surrounds drum 78 and is actuated to engage the drum by a rubber tube 85 carried by casing 86 fixed to casing section 27. The brake band is normally expanded by suitable spring means between the sections and is contracted by the rubber tube when it is inflated by pressure fluid in a system supplied by pump 51.

The clutch mechanism 14 includes a disk member 87 fixed on the front end of shaft 72 having clutch teeth 88 and a peripheral cone brake surface 89. Clutch member 90 is slidably splined on shaft 71 and has teeth 91 engageable with teeth 88. This clutch member 90 may be shifted by any well known mechanism engaged with its radial extension 92. A synchronizer disk 93 has a brake rim 94 adapted to engage the surface 89 to bring shafts 71 and 72 to the same speed before the associated clutch teeth can be engaged. Disks 93 and 95 are connected by pin 99 extending through an opening 97 in extension 92. An angular spring 98 also extends through the opening and is bent to embrace disks 93 and 95. As the clutch member 90 is shifted toward shaft 72, spring 98 is engaged and carries the synchronizer disks 95 and 93 therewith engaging brake rim 94 with surface 89. Further continued movement of the clutch to engage teeth 91 with teeth 88 is prevented until shafts 71 and 72 have been brought to the same speed by engagement of the pin cone surface 96 overlying opening 97 due to their relative rotation. When the direction of relative rotation between shafts 71 and 72 begins to reverse, the pin cone surface 96 is moved rotationally off the edge of opening 97, and opening 97 being larger than the enlarged portion of the pin 99 adjacent pin cone surface 96, said pin will be moved through opening 97, thereby allowing the clutch member 90 to be moved into engaged relation with shaft 72.

First or low speed forward drive is obtained by engaging brake 52 to prevent retrograde movement of carrier 39 when the crankshaft is driving shaft 20 through the overrunning clutch connection 22. This will occur automatically when the crankshaft speed is low so that fluid pressure in the coupling is ineffective to drive the rotors at a drive effective speed. Assuming that clutch mechanism 14 is engaged and that clutch device 44 and the reverse brake device are disengaged, the low speed drive will flow directly from the crankshaft through clutch 22, shaft 20, gears 32, 36, 37 and 34 to shaft 70, the torque-speed device, shaft 71, clutch mechanism 14 and shaft 72.

Second or intermediate speed drive is automatically obtained with the controls in the same relation as in first speed drive when the impeller rotation creates a fluid force in the coupling sufficient to rotate the primary rotor at a speed where it drives the stepped planet gear unit at a speed causing shaft 20 to overrun the crankshaft. The drive will then flow through shaft 24, the coupling impeller and primary rotor through gears 33, 35, 37 and 34, shaft 70, the torque-speed device, shaft 71, clutch mechanism 14 and shaft 72.

High speed drive takes place at some predetermined operating condition when vehicle speed overcomes torque whereby the flyweights move out to condition the hydraulic system to engage clutch device 44. At the same time provision is made to disengage brake 52. The reverse brake is disengaged in all forward speed drives. The carrier 39 is now fixed to rotate with the secondary rotor 17 and such rotor is being driven substantially at the same speed as the impeller and primary rotor except for some slip. The crankshaft will rotate shaft 20 directly and the coupling will rotate the carrier in a forward direction. Shaft 20 will actuate gears 32 and 36, but as brake device 52 is now released, such drive tends to rotate the carrier in retrograde direction. At the same time the secondary rotor 17 is being driven at substantially the same speed as the impeller, and, as the secondary rotor is connected directly with the carrier, by the clutch device, fluid in the coupling serves as reaction means for the drive. As a result there will be two paths of power flow from the crankshaft to the driven shaft, one path being through the low speed gearing and the other path being through the coupling secondary rotor, the clutch device 44 and the carrier. The high speed drive will be less than 1:1 because of slip caused by reaction through the secondary rotor. In this drive, the primary rotor will idle. It may be said that the input power flowing to gear 34 from the crankshaft is divided.

In reverse drive, brake 84 is engaged and brake device 52 and clutch device 44 are disengaged. The drive will flow from either the crankshaft or the primary rotor depending upon the fluid force present in the coupling. In either case the carrier 34 is free to turn rearwardly as brake device 52 and clutch device 44 are released. Rotation of the planetary unit by either gears 32 or 33 will turn the carrier in a reverse direction rotating gear 80 therewith and carrying disk 77 therewith through the planet gear 81 meshing therewith, but the speed will be reduced because of gear 81 meshing with gear 83 on the stationary reaction member 78. At the same time gear 80 will be carried in a reverse direction by gears 34 and 37, although gear 34 is rotating on its axis tending to drive gear 37 and shaft 70 forwardly. Thus the carrier 39 and shaft 70 contribute to the reverse drive which is reduced through gear 81. The secondary rotor 17 will idle because clutch device 44 is disengaged.

The fluid system for the controls in the transmission is shown in Fig. 3. Pump 51 is suitably connected with the transmission sump 100 by conduit 101, and another pump 102 is connected with the sump by conduit 103. Pump 102 is carried in wall 31 and is driven by shaft 71. There are two pressure fluid circuits, one for the clutch device 44 and another for the brake devices 52 and 85, and a selector device 104 alternately controls flow to brake device 52 and clutch device 44. The selector device comprises a housing 105 in which is arranged a valve 106 and spring 107. The fluid control circuit for brake device 52 comprises pump 51, conduit 108 connecting the pump 51 with selector housing 105 and the conduit 109 connecting the selector housing with the interior of brake tube 54. The selector valve has a peripheral recess 110 for establishing communication between conduits 108 and 109 when in one position. The conduit 108 has a branch 111 leading to the interior of brake tube 85 and flow to the selector housing or the branch is controlled by valve 112.

The fluid control circuit for clutch device 44 comprises pump 102, conduit 113 leading from the pump to the housing 105 of the selector device and conduit 114 leading from housing 105 to pockets 59. A branch conduit 115 connects conduit 113 with one end of housing 105 so that fluid pressure may act against valve 106 to place the recess 110 to establish communication between conduits 113 and 114. Normally, spring 107 acts to move the valve to shut off conduit 114 from conduit 113 so that the clutch device 44 will disengage and to open communication between conduits 108 and 109 to engage brake device 52. Thus pressure in the clutch fluid actuating circuit controls alternate engagement and disengagement of brake device 52 and clutch device 44.

Pressure in the fluid circuit for the clutch device 44 is preferably controlled by the torque-speed device, previously referred to. Conduit 113 terminates in an axial passage 116 and a radial vent passage 117 in shaft 71. A seat ring 118 is fixed in the vent passage and fluid venting therethrough is controlled by a ball valve 119 seated under pressure of spring 120. One of the flyweights 75 carries a stem 121 extending through the seat ring for controlling the position of the ball valve relative to its seat. The arrangement is such that the valve will be unseated while the flyweight is in an inner range of its centrifugal movement, and seated while the flyweight is in an outer range of its centrifugal movement. The selection of the length of stem 121 determines the point in the flyweight movement at which valve opening and closing is effected. Thus the venting of conduit 113 may be prevented to supply pressure fluid to the selector device so that the valve will shift to allow fluid flow to engage clutch device 44, and venting of conduit 113 will relieve pressure in conduit 113 so that spring 107 will seat the valve to break the fluid circuit to the clutch device and establish the fluid circuit to the brake devices 52 or 85, depending on the position of valve 112. When reverse drive is established, torque will move the flyweights outwardly which would allow valve 119 to seat and thereby cause engagement of the clutch device 44, but such clutch engagement is prevented by valve 125 in conduit 113. This valve 125 may be operated by any conventional means to vent line 113 when reverse drive is established, and such valve may be operated by the means provided to control valve 112 so that valve 125 opens when valve 112 is adjusted to allow fluid flow to reverse brake tube 85.

The mechanical connection between the gearing and the crankshaft insures drive without slip for the low speed drive and the utilizing of such drive with the fluid coupling drive in high speed drive contributes to the efficiency of the transmission. The transmission is also arranged so that a single shift of the clutch mechanism 14 establishes either forward or reverse drive. Furthermore, the parts and controls are arranged to require a minimum space so that a compact structure is provided.

It will be understood that various forms of the invention other than that described above may be used without departing from the spirit or scope of the invention.

What I claim is:

1. In a transmission mechanism, input power means, a fluid coupling having an impeller driven by the input means and a rotor, a driven shaft having a gear fixed thereto, a primary shaft having a gear fixed thereto, an overrunning clutch between the input means and the primary shaft, a shaft fixed to the rotor, torque multiplying gear means meshing with the gears on said driven and primary shafts, a carrier for the gear means, means operable to brake the carrier, and a clutch device operable to secure the rotor shaft and the carrier together for unitary rotation.

2. In a power transmission, a power input shaft, a driven shaft, a fluid coupling including an impeller fixed to the power shaft and two rotors, said impeller and rotors having a plurality of segmentally shaped radially disposed fluid circulating passages formed therein, and the rotors being disposed to successively receive the fluid circulated by the impeller, planetary gearing connected with the driven shaft, a planet gear carrier, means for mechanically connecting the gearing and the input shaft, connections between one of the rotors and the gearing, and means operable to connect the other rotor for unitary rotation with the carrier.

3. In a power transmission, a power drive shaft, a driven shaft, a fluid coupling including an impeller fixed to the drive shaft and primary and secondary rotors through which fluid is circulated in series from the impeller, planetary gearing connected to the driven shaft, a carrier for the gearing, means for braking the carrier, a mechanical connection between the drive shaft and the gearing including an overrunning clutch, a mechanical connection between the gearing and the primary rotor, and clutch device for connecting the secondary rotor and the carrier for unitary rotation, said secondary rotor and said drive shaft acting jointly to drive the gearing when the clutch device is engaged.

4. In a power transmission, a power drive shaft, a driven shaft, a fluid coupling including an impeller fixed to the drive shaft and primary and secondary rotors through which fluid is circulated in series from the impeller, planetary gearing including a carrier and a multiple gear planet mounted on the carrier and geared to the driven shaft, a first speed mechanical drive connection including an overrunning clutch between the drive shaft and one of the gears of the planet, a second speed mechanical drive connection between the primary rotor and another of the gears of the planet, a third speed mechanical drive connection including a clutch device between the secondary rotor and the carrier, and a brake operable to prevent retrograde rotation of the carrier when the clutch device is released.

5. Transmission mechanism comprising a drive shaft, a driven shaft, a fluid coupling having an impeller fixed to the drive shaft and two rotors, planetary gearing having a carrier and two gear trains connected to drive the driven shaft, means including an overrunning clutch for connecting the drive shaft with the low speed gear train, means connecting one of the rotors with the high speed gear train, a connection including a clutch device operable to couple the other rotor and the carrier, and a brake operable to prevent retrograde movement of the carrier.

6. Transmission mechanism comprising a power operated fluid coupling having an impeller and two rotors, three telescopically related shafts, planetary gearing having a multiple planet gear unit and a carrier, the two inner shafts being geared to the planet unit to drive at different gear ratios, an overrunning clutch for connecting the lower speed shaft to rotate with the impeller, the higher speed shaft being fixed to rotate with one of the rotors, means operable to connect the carrier and the other rotor to rotate together, and means operable to prevent retrograde rotation of the carrier when the means for connecting the carrier and rotor is ineffective.

7. In a transmission mechanism, a fluid coupling having a power operated impeller and a rotor, a driven shaft, an output shaft, an overrunning clutch for connecting the impeller and the output shaft to rotate in unison, planetary gearing including a carrier connecting the output shaft with the driven shaft, a shaft fixed to the rotor, a carrier extension into which the rotor driven shaft extends, brake means engageable with the carrier extension, and a positive clutch device between the carrier extension and the adjacent rotor shaft for effecting unitary rotation of the rotor and the carrier.

8. In a transmission mechanism, a fluid coupling having a power operated impeller and primary and secondary rotors, an output shaft, an overrunning clutch for connecting the impeller and said shaft to rotate in unison, a second output shaft fixed to the primary rotor telescoping the first-mentioned output shaft, a driven shaft, planetary gearing connecting the output shafts with the driven shaft to provide drives in two speed ratios, said gearing including a stepped planet gear mounted on a carrier, a carrier extension surrounding the output shafts forming a housing, a brake for engaging the carrier extension, a shaft fixed to the secondary rotor extending into the housing, clutch means in the housing for connecting the carrier extension to the secondary rotor drive shaft, pressure operated means in the housing for engaging the clutch means, and spring means in the housing for normally moving the clutch engage means to disengaging position.

9. In a transmission mechanism having change speed gearing, a fluid-operating device for effecting a reduced drive through the gearing, a shaft driven by the gearing, a tail shaft, a pivoted lever rotatable with one of the shafts, a pivoted connection between the lever and the other of said shafts and adapted to transmit torque between the shafts, weights on the pivoted lever positioned to cause the centrifugal force developed in the weights to oppose the resistance to rotation imposed by the load on the tail shaft, a fluid system for controlling the fluid-operated device, a valve in the fluid system, a second fluid system connected to the valve, a spring for moving the valve to operate the fluid-operated device, said second fluid system acting upon the valve to oppose the spring, a vent valve for the second system, and a connection between the vent valve and the centrifugal weights whereby to move the vent valve to vent the second system when the weights are moved radially inward and thereby to effect a reduced drive through the gearing.

10. In a transmission mechanism having change speed planetary gearing, a carrier for the gearing, a shaft driven by the gearing, a tail shaft, and a brake device operable to hold the carrier against rotation to effect a reduced speed drive through the gearing, control means for the brake device comprising pivoted flyweights rotatable with the driven shaft, means connecting the tail shaft to the flyweights to transmit the drive from the driven shaft to the tail shaft through the flyweights, said means acting upon the flyweights in opposition to centrifugal force developed in the flyweights, a pressure fluid system including a fluid pressure controlled valve for applying the brake device and operable to move the fluid pressure controlled valve to its brake releasing position when pressure is released in the system, a second pressure fluid system controlling said valve, a vent valve in the second fluid system, and means movable with the flyweights to move the vent valve to its venting position when the torque transmitted through the flyweights exceeds a predetermined value, thereby applying the brake to effect a reduced speed drive through the gearing.

ROBERT P. CLIFTON.

REFERENCES CITED

The following references are of record in the file of this patent:

UNITED STATES PATENTS

| Number | Name | Date |
|---|---|---|
| 2,308,547 | Schneider | Jan. 19, 1943 |
| 2,316,390 | Biermann | Apr. 13, 1943 |
| 2,324,713 | McFarland | July 20, 1943 |
| 2,326,994 | Duffield | Aug. 17, 1943 |
| 2,332,593 | Nutt | Oct. 26, 1943 |
| 2,355,427 | Duffield | Aug. 8, 1944 |
| 2,373,234 | Duffield | Apr. 10, 1945 |
| 2,378,577 | Oldfield | June 19, 1945 |